United States Patent
Jose et al.

(10) Patent No.: US 10,114,688 B2
(45) Date of Patent: Oct. 30, 2018

(54) SYSTEM AND METHOD FOR PERIPHERAL BUS DEVICE FAILURE MANAGEMENT

(71) Applicant: Dell Products L.P., Round Rock, TX (US)

(72) Inventors: Cyril Jose, Austin, TX (US); James Peter Giannoules, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 419 days.

(21) Appl. No.: 14/623,164

(22) Filed: Feb. 16, 2015

(65) Prior Publication Data

US 2016/0239371 A1 Aug. 18, 2016

(51) Int. Cl.
*G06F 11/07* (2006.01)

(52) U.S. Cl.
CPC ........ *G06F 11/0793* (2013.01); *G06F 11/079* (2013.01); *G06F 11/0745* (2013.01)

(58) Field of Classification Search
CPC ............ G06F 11/0745; G06F 11/0766; G06F 11/0793; G06F 11/201; G06F 11/2092
See application file for complete search history.

(56) References Cited

U.S. PATENT DOCUMENTS

| | | | | |
|---|---|---|---|---|
| 6,400,925 B1* | 6/2002 | Tirabassi | ........... | H04B 7/18515 455/12.1 |
| 8,144,711 B1* | 3/2012 | Pegrum | ............... | H04L 12/4641 370/218 |
| 8,917,734 B1* | 12/2014 | Brown | ................ | G06F 13/4022 370/400 |
| 2007/0130407 A1* | 6/2007 | Olson | ................ | G06F 13/4282 710/305 |
| 2012/0030402 A1* | 2/2012 | Murakami | ............ | H04L 1/0045 710/313 |
| 2012/0311206 A1* | 12/2012 | Chencinski | ......... | H04L 41/0654 710/105 |
| 2014/0173167 A1* | 6/2014 | Choi | ................... | G06F 13/4022 710/316 |
| 2015/0006780 A1* | 1/2015 | Shao | ................... | G06F 13/4022 710/316 |
| 2015/0082080 A1* | 3/2015 | Lin | ..................... | G06F 11/0745 714/5.1 |

* cited by examiner

*Primary Examiner* — Jigar Patel
(74) *Attorney, Agent, or Firm* — Baker Botts L.L.P.

(57) ABSTRACT

A system and method for managing peripheral device failures is disclosed. The method includes detecting, at a processor of a peripheral bus, a failure of a first bus device at a downstream port from the processor. The downstream port is populated by the first bus device and the processor is communicatively coupled at an upstream port to a root complex. The processor is configured to isolate the failure of the first bus device from the root complex. The method also includes, responsive to detecting the failure, suspending communication of data to the first bus device, receiving information regarding a second bus device selected from a cluster of a plurality of bus devices, and assigning the second bus device to the downstream port.

14 Claims, 4 Drawing Sheets

SYSTEM AND METHOD FOR PERIPHERAL BUS DEVICE FAILURE MANAGEMENT

TECHNICAL FIELD

This disclosure relates generally to information handling systems and, more particularly, to a system and method for peripheral bus device failure management.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include peripheral buses in the system architecture. A peripheral bus enables connectivity to external devices, such as plug-in cards, thereby providing a hardware expansion mechanism for the information handling system. Accordingly, peripheral buses may be supported by corresponding software architecture, including support by an operating system executing on the information handling system. One common example of a peripheral bus is a Peripheral Component Interconnect (PCI) bus, which has been used in information handling systems for many hardware and software generations. A current version of the PCI bus is the PCI Express (PCIe) bus.

Peripheral bus switches provide sharing of peripheral bus devices, also referred to as "bus endpoints," "bus devices," or "devices," across multiple information handling systems, for example servers. Issues arise when one or more of the bus devices fail or a surprise removal occurs and repair or replacement may be necessary. Such failures impact the availability of the bus devices to the information handling systems. Additionally, management of availability of bus devices is performed at the operating systems of the various information handling systems, which consumes resources within the information handling systems.

Currently, proprietary support systems exist for managing bus device availability. Such support systems are cumbersome and costly, and are generally only applicable to a particular operating system. Further, proprietary support systems may require modification to the individual bus device drivers. Thus, bus devices may be burdened with increasing vendor and/or operating system-specific features. Moreover, proprietary support systems may not provide the necessary resolution to a bus device failure. For example, in the case of a storage controller, some support systems may not be able to identify a failure in certain portions of the link between a peripheral bus switch and a bus device. Some proprietary support systems are often applicable to only one type of bus device, such as storage devices. It may be difficult or impractical to extend such proprietary support systems to other devices, such as network cards or general-purpose computing on graphics processor units (GPGPUs). Thus, the management of peripheral bus devices and associated failures and errors is undesirable in many information handling systems and associated operating systems.

SUMMARY

In some embodiments, a method for managing peripheral device failures is disclosed. The method includes detecting, at a processor of a peripheral bus, a failure of a first bus device at a downstream port from the processor. The downstream port is populated by the first bus device, and the processor is communicatively coupled at an upstream port to a root complex. The processor is configured to isolate the failure of the first bus device from the root complex. The method also includes, responsive to detecting the failure, suspending communication of data to the first bus device, receiving information regarding a second bus device selected from a cluster of a plurality of bus devices, and assigning the second bus device to the downstream port.

In another embodiment, an information handling system for managing peripheral device failures is disclosed. The system includes a processor for a peripheral bus. The processor is configured to detect a failure of a first bus device at a downstream port from the processor. The downstream port is populated by the first bus device, and the processor is communicatively coupled at an upstream port to a root complex. The processor is configured to isolate the failure of the first bus device from the root complex. Responsive to detecting the failure, the processor is further configured to suspend communication of data to the first bus device, receive information regarding a second bus device selected from a cluster of a plurality of bus devices, and assign the second bus device to the downstream port.

In a further embodiment, a non-transitory computer-readable medium is disclosed that stores instructions that, when executed by a processor, cause the processor to detect a failure of a first bus device at a downstream port from the processor. The downstream port is populated by the first bus device, and the processor is communicatively coupled at an upstream port to a root complex. The processor is configured to isolate the failure of the first bus device from the root complex. The processor is also caused to, responsive to detecting the failure, suspend communication of data to the first bus device, receive information regarding a second bus device selected from a cluster of a plurality of bus devices, and assign the second bus device to the downstream port.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

As noted previously, many information handling systems or groups of information handling systems may utilize a peripheral bus and a peripheral bus switch, such as a PCIe bus and a PCIe switch. In some embodiments, a peripheral bus switch may incorporated with or be utilized in connection with an arbitration entity. An arbitration entity may assist in the management and assignment of peripheral bus devices to one or more information handling systems in a group of information handling systems. Arbitration entities may improve flexibility in managing and sharing peripheral bus devices across multiple information handling systems. In some embodiments, failures of peripheral bus devices may also be detected, managed, and resolved by an arbitration entity together with an associated management module without awareness of the failure by the multiple information handling systems. Thereby, an arbitration entity may provide for high availability of peripheral bus devices to the multiple information handling systems.

The peripheral bus may originate at a root complex, which is a device that connects a processor of one or more information handling systems and the memory of one or more information handling systems to the peripheral bus fabric. In some embodiments, the root complex is included within a processor. The peripheral bus fabric may further include one or more bus switches, which may extend root ports of the root complex to additional downstream ports of the peripheral bus. Thus, peripheral bus ports for population with bus devices may be serviced by the root complex or the bus switch, which may include bus controller functionality. The bus controller functionality may include configuration and installation of new bus devices, as well as deconfiguration and removal of bus devices that are no longer present.

In some embodiments, the arbitration entity may be associated with the bus controller or other component of the peripheral bus switch. In other embodiments, the arbitration entity may be a separate component from the bus switch and/or may be communicatively coupled to the bus switch. The arbitration entity may be communicatively coupled to and located downstream from the root complex thereby isolating bus device management, including failures and resulting actions, from the root complex. Multiple bus devices of a similar type may be aggregated downstream from the arbitration entity, which may present a single device of that type upstream to the root complex. In some embodiments, the arbitration entity may incorporate a management module, such as planar switch management (PSM) firmware. The management module may identify categories of bus devices, group redundant bus devices into a cluster, and identify a primary bus device for each cluster. The arbitration entity may present the selected primary bus device upstream to the root complex.

As will be described in further detail herein, the arbitration entity and management module may manage bus device failures, such as by containing, recovering, replacing, and monitoring, a failure at a bus device without awareness of the failure by the root complex and other upstream components. Accordingly, the methods and systems disclosed herein for bus device failure management may be agnostic to an operating system that currently supports the peripheral bus.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, a server, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, a bus switch and a root port may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2A, 2B, and 3 wherein like numbers are used to indicate like and corresponding parts.

Figure 1:
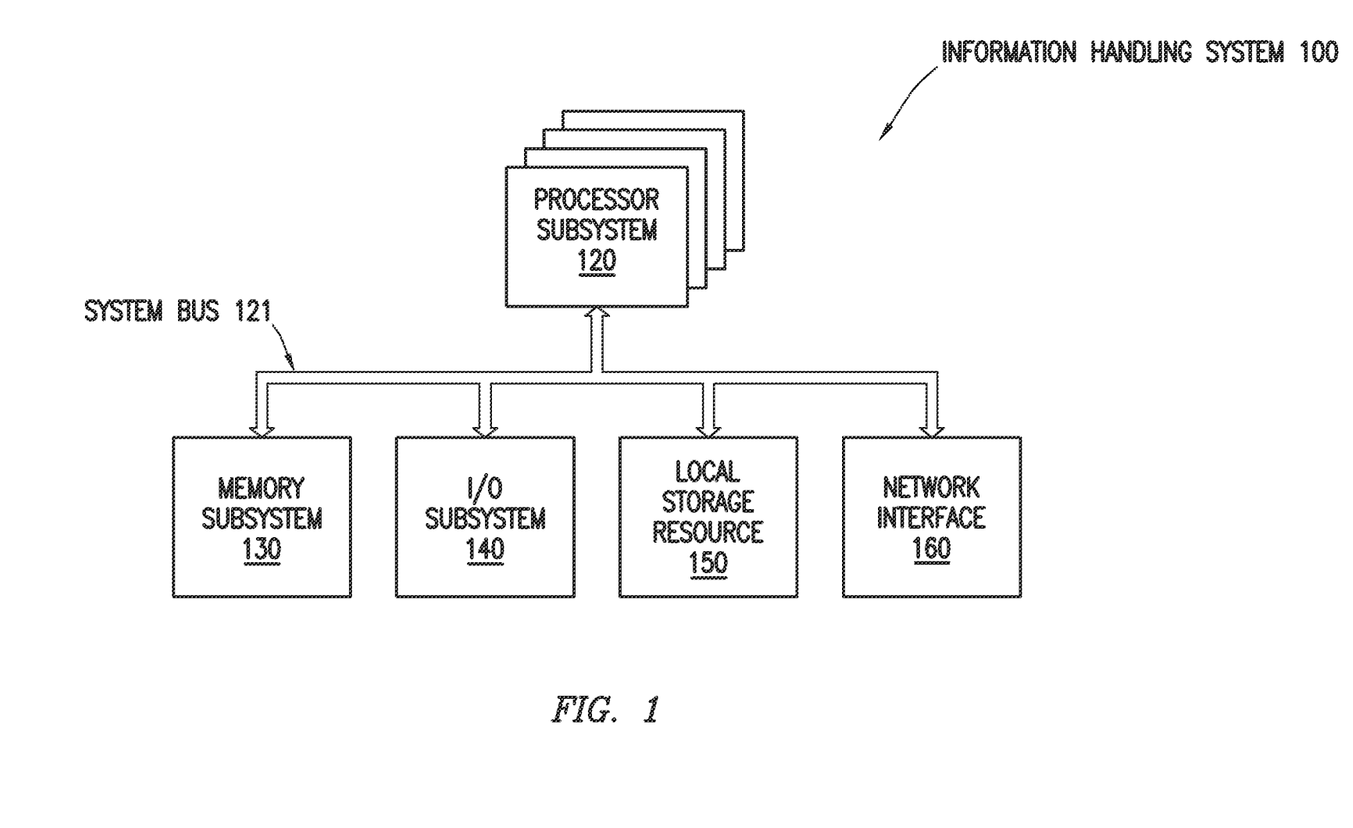
FIG. 1 illustrates a block diagram of selected elements of an embodiment of an information handling system in accordance with some embodiments of the present disclosure.

FIG. 1 illustrates a block diagram of selected elements of an embodiment of an information handling system 100 in accordance with some embodiments of the present disclosure. As described herein, information handling system 100 may represent a server, a storage device, a redundant array of independent disks (RAID) controller, a personal computing device, such as a personal computer system, a desktop computer, a laptop computer, a notebook computer, etc., operated by a user. In various embodiments, information handling system 100 may be operated by the user using a keyboard and a mouse (not shown). Components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, HyperTransport (HT) bus, and Video Electronics Standards Association (VESA) local bus, among others.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may comprise a touch panel and display adapter.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data.

Network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to various transmission protocols and/or standards. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

In operation, system bus 121 or I/O subsystem 140 may comprise a peripheral bus that enables information handling system 100 to accept and communicatively integrate peripheral bus devices. A bus controller or other component included with or separate from the peripheral bus may be enabled with an arbitration entity for peripheral bus device failure management as described in further detail below.

Figure 2A:
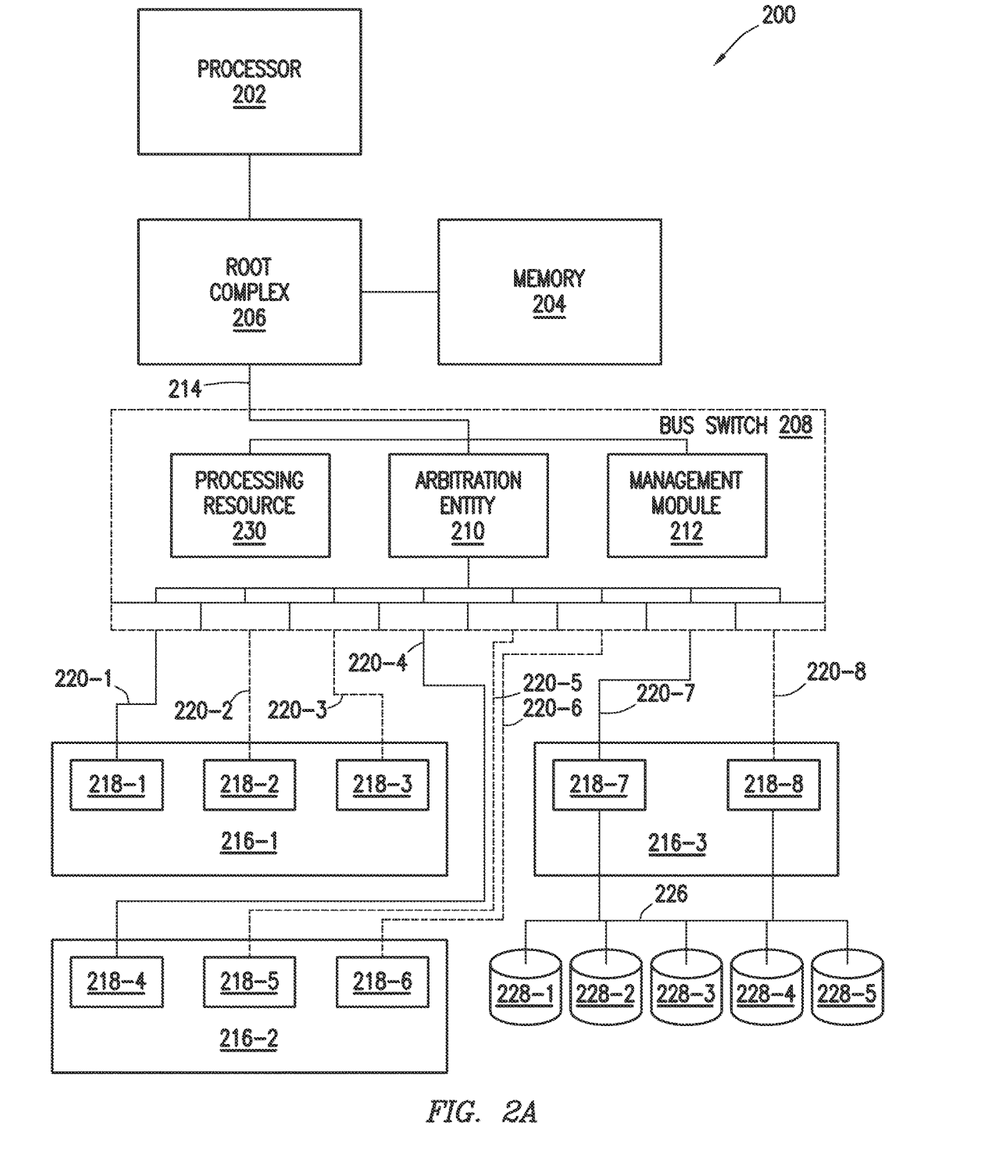
FIGS. 2A and 2B illustrate block diagrams of selected elements of embodiments of peripheral bus architectures in accordance with some embodiments of the present disclosure.
Figure 2B:
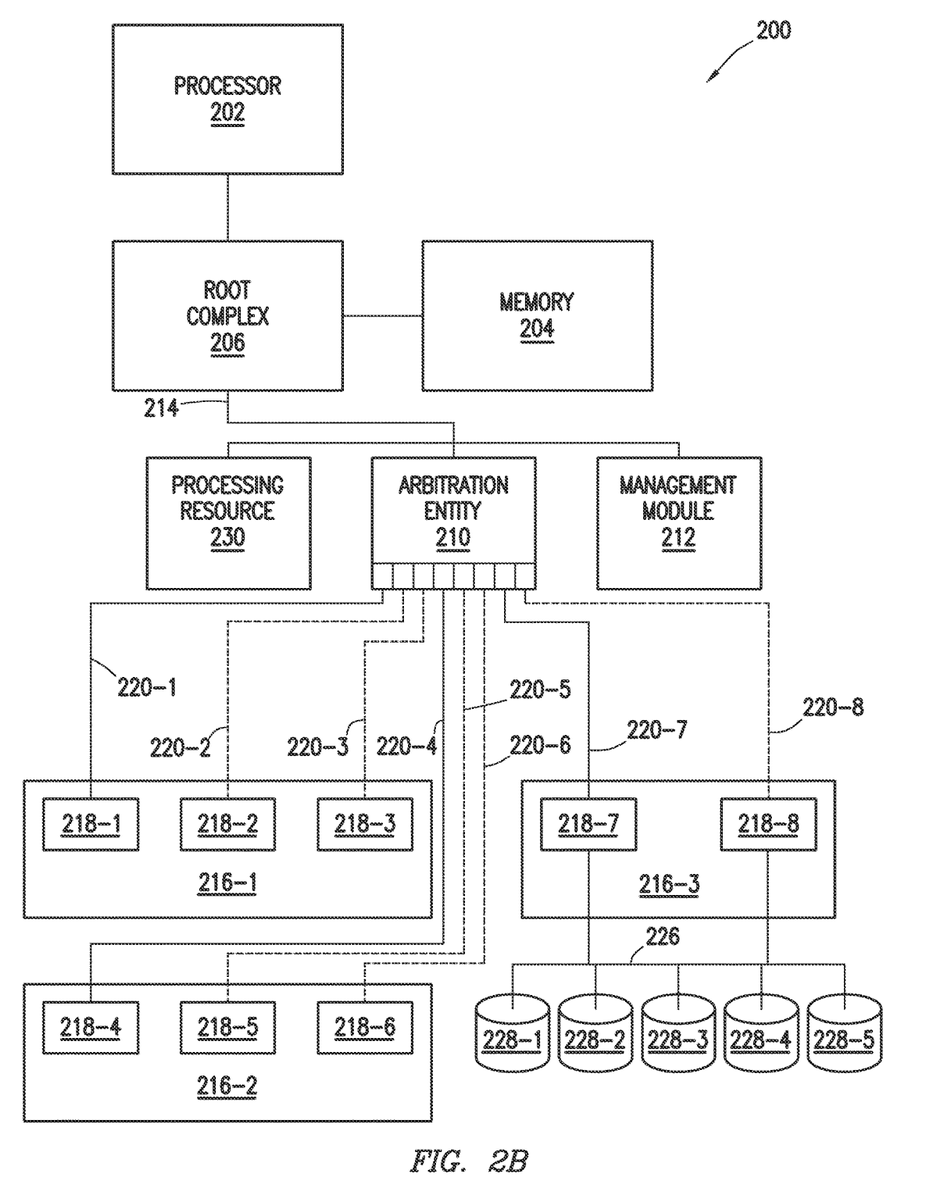

FIGS. 2A and 2B illustrate block diagrams of selected elements of embodiments of peripheral bus architectures 200a and 200b, respectively, in accordance with some embodiments of the present disclosure. As shown, peripheral bus architectures 200a and 200b may be implemented partially in information handling system 100 (see FIG. 1) or may be implemented separately from information handling system 100. Peripheral bus architectures 200a and 200b include processor 202, memory 204, and root complex 206, among other elements. In various embodiments, peripheral bus architectures 200a and 200b may be architectures for implementing a PCIe bus.

In some embodiments, root complex 206 is communicatively coupled to processor 202 and memory 204. Root complex 206 may be a device that generates peripheral bus transactions that originate from processor 202, one or more information handling systems, other processing systems, or any other suitable device. Connections between root complex 206 and processor 202 and between root complex 206 and memory 204 may use high speed communication that supports data transfer rates for a peripheral bus. In some embodiments, root complex 206 may be implemented as an individual device. In particular embodiments, root complex 206 may be integrated within processor 202. Root complex 206 may accordingly instantiate one or more root ports 214 for the peripheral bus that may be populated by bus switches 208 (shown in FIG. 2A) or other processing resource 230 and/or arbitration entity 210 (as shown in FIG. 2B). Instantiated bus ports may be referred to as downstream ports, corresponding to a distal location of the downstream ports in peripheral bus architectures 200a and 200b. A port of the peripheral bus may correspond to a slot for a bus device, such as a plug-in card.

In some embodiments, peripheral bus architecture 200a shown in FIG. 2A may include bus switch 208. In such a configuration, bus switch 208 may include processing resource 230 communicatively coupled to arbitration entity 210 and management module 212. Further, peripheral bus architecture 200a may be configured with downstream ports 220 as ports of bus switch 208.

In some embodiments, peripheral bus architecture 200b shown in FIG. 2B may include processing resource 230 communicatively coupled to arbitration entity 210 and management module 212, which may be separate from a bus switch. As such, peripheral bus architecture 200b may be configured with downstream ports 220 as ports of arbitration entity 210. Moreover, although shown as one arbitration entity 210 with multiple downstream ports 220, in some embodiments, each downstream port 220 may be configured with an arbitration entity communicatively coupled to processing resource 230 and management module 212 and/or each set of downstream ports 220 associated with a particular cluster 216 may be configured with an arbitration entity communicatively coupled to processing resource 230 and management module 212.

Referring to FIG. 2A and peripheral bus architecture 200a, bus switch 208 may include any system, device, or apparatus configured to provide an I/O interface between root complex 206 and bus devices 218. For example, bus switch 208 may be a PCIe switch and bus devices 218 may be peripheral devices in accordance with the PCIe standard. Further, in accordance with the PCIe standard, bus switch 208 may comprise a multi-ported switch. In other embodiments, bus switch 208 may comprise a generalized PC bus switch, an Infiniband switch, or other suitable switch. Bus switch 208 may operate in a redundant mode for shared devices (e.g., bus devices 218) and in non-redundant mode for non-shared/zoned devices. As used herein, shared devices may refer to those which may be visible to more than one information handling system 100, while non-shared devices may refer to those which are visible to only a single information handling system 100. Bus Switch 208 may operate in a scenario to enable bus devices as shared devices, which renders the devices capable to be visible to more than one information handling system 100. In PCIe context, switches operating in these scenarios are referred to as multi-root aware switches.

Bus switch 208 may represent a device that can instantiate multiple downstream ports from an upstream port. For bus switch 208, root port 214 is an upstream port from root complex 206. In some embodiments, bus switch 208 may instantiate downstream ports 220. Downstream ports 220-1 through 220-8 may be populated by bus devices 218-1 through 218-8, respectively. Although downstream ports 220 may be communicatively coupled to bus devices 218, only when a particular bus device 218 is designated as the active or primary bus device is that particular bus device connected or assigned to a particular downstream port 220. For example, if bus device 218-1 is designated a primary bus device, then it is connected or assigned to a port, e.g. downstream port 220-1. As such, while FIG. 2A illustrates a separate downstream port for each bus device, downstream ports may be shared between bus devices. For example, one bus device may be selected as a primary bus device and connected to a particular downstream port and other bus devices may be communicatively coupled to the particular downstream port as redundant or reserve bus devices.

Root complex 206 and/or bus switch 208 may include bus controller functionality for the peripheral bus. The bus controller functionality may include functionality to recognize new bus devices 218 and/or storage resources 228; process data transactions and errors to and from bus devices 218 and/or storage resources 228; and detect when bus devices 218 and/or storage resources 228 have been removed. So-called "hot plug" functionality may comprise installation and removal of bus devices while peripheral bus architecture 200a is powered on. Accordingly, the bus controller functionality of root complex 206 and bus switch 208 may include hot-plug functionality for instantiated downstream ports. The bus controller functionality may include notifications and alerts, such as interrupts, to processor 202. The bus controller functionality may further include support for an operating system (not shown), for example, via operating system drivers for root complex 206 and bus switch 208, respectively.

Processing resource 230 may comprise a system, device, or apparatus operable to interpret and/or execute program instructions and/or process data, and may include a microprocessor, microcontroller, DSP, ASIC, or another digital or analog circuitry configured to interpret and/or execute program instructions and/or process data. In some embodiments, processing resource 230 may interpret and/or execute program instructions and/or process data stored locally (e.g., in a memory). Processing resource 230 may be included as an element of bus switch 208 as shown in FIG. 2A or may be separate from a bus switch, as shown in FIG. 2B. In some embodiments, processing resource 230 may be communicatively coupled to or otherwise configured to execute program instructions and store data related to arbitration entity 210 and management module 212.

Arbitration entity 210 may be included as part of a bus controller, a processor, or any other suitable component. Arbitration entity 210 may include any hardware, software, or firmware capable to receive and transmit data. Although illustrated as included in bus switch 208 in FIG. 2A, arbitration entity 210 may be separate from and communicatively coupled to bus switch 208 or may be incorporated in any other suitable component of a bus architecture separate from a bus switch as shown in FIG. 2B. As such, downstream ports 220-1 through 220-8 may in some embodiments be ports associated with arbitration entity 210 as shown in FIG. 2B. Arbitration entity 210 may be operable to implement one or multiple PCIe device functions and may be configured by root complex 206. For example, arbitration entity 210 may be utilized to implement a transaction layer packet (TLP) queue and forward the TLP traffic to the downstream bus devices 218 from root complex 206. Further, arbitration entity 210 may be operable to be configured "out-of-band" by using management module 212 and communication that is isolated from "in-band" traffic generally used for non-management communications. Although downstream ports 220 may be communicatively coupled to bus devices 218, only when a particular bus device 218 is designated as the active or primary bus device is that particular bus device connected or assigned to a particular downstream port 220. For example, if bus device 218-1 is designated a primary bus device, then it is connected or assigned to a port, e.g. downstream port 220-1. As such, while FIG. 2B illustrates a separate downstream port for each bus device, downstream ports may be shared between bus devices. For example, one bus device may be selected as a primary bus device and connected to a particular downstream port and other bus devices may be communicatively coupled to the particular downstream port as redundant or reserve bus devices.

In some embodiments, management module 212 may be included in as part of a bus controller, a processor, or any other suitable component. Management module 212 may include any hardware, software, or firmware capable to manage and prepare bus devices 218 configured in redundant clusters 216. Management module 212 may be operable to select, present, and/or communicatively couple a primary bus device from each redundant cluster 216 for use by arbitration entity 210 and/or processing resource 230. Management module 212 may transmit information regarding a selected primary bus device to arbitration entity 210 for use by root complex 206. For example, generally transmitting the information regarding a selected primary bus device may be accomplished by register value writes on the specific arbitration entity port registers using the management module 212 to arbitration entity 210 communication interface, which may be an I2C bus or a PCIe bus.

Bus devices 218 may include any system, apparatus, or device operable to provide peripheral services to one or more information handling systems or any other suitable component. For example, bus devices 218 may be a storage controller, a network controller, a network interface card (NIC), general-purpose computing on graphics processor units (GPGPUs), a CPU, or any other suitable peripheral device. As shown in FIGS. 2A and 2B, bus architectures 200a and 200b may include multiple bus devices 218 of the same type. For example, bus devices 218-1, 218-2, and 218-3 may be NICs of similar configuration. As another example, bus devices 218-4, 218-5, and 218-6 may be GPGPUs of similar configurations. As further example, bus devices 218-7 and 218-8 may be storage controllers of similar configurations.

In some embodiments, bus devices 218 may include relatively simple or stateless devices or relatively complicated multiple state devices. For example, bus devices 218-7 and 218-8 may be storage controllers, which may be multiple state devices. Storage controllers may be operable to manage the communication of data between one or more root complexes 206 and/or information handling systems 100 and one or more of storage resources 228. In certain embodiments, storage controllers may provide functionality including, without limitation, disk aggregation and redundancy (e.g., RAID), I/O routing, and error detection and recovery. Downstream port 220-7 may be populated by a first storage controller as bus device 218-7, and downstream port 220-8 may be populated by a second storage controller as bus device 218-8. As such, bus architectures 200a and 200b may include a plurality of storage controllers, and in such embodiments, storage controllers may be configured as redundant. In some embodiments, storage controllers may be shared among two or more bus switches 208. As also shown in FIGS. 2A and 2B, each bus device 218 that is a storage controller may be coupled to one or more storage resources 228 via connection 226.

Storage resources 228 may include hard disk drives, magnetic tape libraries, optical disk drives, magneto-optical disk drives, compact disk drives, compact disk arrays, disk array controllers, and/or any computer-readable medium operable to store data. In particular embodiments, storage resources 228 may comprise solid state storage devices. In some embodiments, storage resources 228 may form all or part of a redundant storage array (e.g., a RAID0 or RAID1 array).

Clusters 216 may represent groups of bus devices 218 that may be the same or similar types or category of devices. Within a particular cluster 216, each bus device 218 may be redundant to every other bus device 218. For example, cluster 216-1 may include bus devices 218 that may each be a NIC; cluster 216-2 may include bus devices 218 that may each be a GPGPU; and cluster 216-3 may include bus devices 218 that may each be a storage controller. Clusters 216 may be defined by management module 212. As bus devices 218 are added to bus architectures 200a and 200b, management module 212 may assign the added bus device 218 to a particular cluster 216. As shown in FIGS. 2A and 2B, when a particular bus device is identified or selected as the primary bus device for a particular cluster, that primary bus device may be assigned or connected via a downstream port to bus switch 208 (shown in FIG. 2A) or arbitration entity 210 (shown in FIG. 2B). Primary devices may be active and illustrated on FIGS. 2A and 2B as solid line downstream ports 220. In some embodiments, redundant or reserve bus devices may be communicatively coupled to, but not connected or assigned to, a particular downstream port 220, as shown by dotted line downstream ports 220 in FIGS. 2A and 2B.

In operation, management module 212 may select a particular bus device 218 from a particular cluster 216 to be considered the primary or active device. For example, from cluster 216-1, bus device 218-1 may be selected as the primary device and placed in fully active state. The remaining bus devices, e.g., bus devices 218-2 and 218-3, may be designated as reserve devices and may be placed in a passive state. In the passive state, the reserve devices may remain powered on and communicatively coupled to management module 212, arbitration entity, 210 and/or bus switch 208. Maintaining the reserve devices in a passive state may assist in rapid substitution in a failover event, e.g., if the primary device fails or becomes inoperable and a reserve device is transitioned to be a new primary device.

In operation, data is communicated from root complex 206 through arbitration entity 210 to the primary device, e.g., bus device 218-1 in the current example. PCI TLPs may flow through arbitration entity 210 and into the primary device. In the event of a failure, arbitration entity 210 may return outstanding TLPs to the requester, e.g., root complex 206 or a particular information handling system 100, with transmission of a request for retry notification. Until being internally switched over and connected to new primary device, arbitration entity 210 may use data link layer packet (DLLP) flow control to ensure the requester cannot send further commands.

In some embodiments, management module 212 may detect a device error at a downstream port populated by a primary device. The device error may be a PCIe-level error, such as a PICe FATAL error indicating that the bus device is no longer responsive to the PCIe bus. In operation, management module 212 may monitor the status of each primary device for the existence of any error condition. Exemplary error conditions monitored by management module 212 may include: link training errors and consistent failure to assume L0 state (or fully active state); indication from the physical function interface or device driver interface of a malfunction (e.g. a PowerEdge RAID Controller (PERC) MegaRAID device driver indicating that the remote small computer system interface (SCSI) RAID access has failed); or TLP error occurrence above a selected threshold of TLP errors.

When an error condition is detected by management module 212, management module 212 may initiate a switch to a new primary device from the other bus devices 218 in the same cluster 216. Management module 212 may designate the new primary device from the reserved or redundant devices based on bus devices 218 that are in a consistent state with current requirements from root complex 206. For example, some types of bus devices 218 may be capable of maintaining the normal flow of TLPs based on the operation of the bus device. Read and write request retries from root complex 206 may eventually be completed. Duplicate read and write requests may generally be harmless. If the state of the reserved devices differ from the current requirements from root complex 206, a new primary device designated from the reserve or redundant devices may be prepared by placing the new primary device into a non-functional state. For example, if the failed primary device is a GPGPU, the data being sent from root complex 206 may not be processed and may need to be resent when the primary device transitions to a non-functional state (e.g., transitions from active to inactive). In this case, the non-functional state is detectable by the upper layers (e.g. device drivers) and may be recoverable. Management module 212 may transmit information regarding the new primary device to arbitration entity 210 and assign the new primary device to arbitration entity 210. Arbitration entity 210 may connect or assign the same or different downstream port 220 to the new primary device. The new primary device may be active and presented upstream to root complex 206, and any flow control restrictions may be lifted. Because the transition from a failed primary device to a new primary device is accomplished by arbitration entity 210, root complex 206 and other upstream components may perceive the device failover event as a spontaneous device transient failure state with substantially no impact on data flow. Accordingly, arbitration entity 210 may serve to isolate root complex 206 and other upstream components from a failure of any bus device 218, such that root complex 206 and other upstream components are unaware of a failure of any bus device 218.

In some embodiments, use of arbitration entity 210, management module 212, and processing resource 230 may improve availability of bus devices from the perception of root complex 206 and other upstream devices. The operating system and operating system device drivers of the upstream devices may have no awareness of bus device 218 failures or failover events, thus reducing the operating system overhead and administration related overhead previously necessary for managing bus devices 218. With reference to storage resources 228, arbitration entity 210 and management module 212 may be used with storage controllers to provide high availability of storage resources. Further, arbitration entity 210 and management module 212 may be utilized across multiple bus device types and/or categories.

Figure 3:
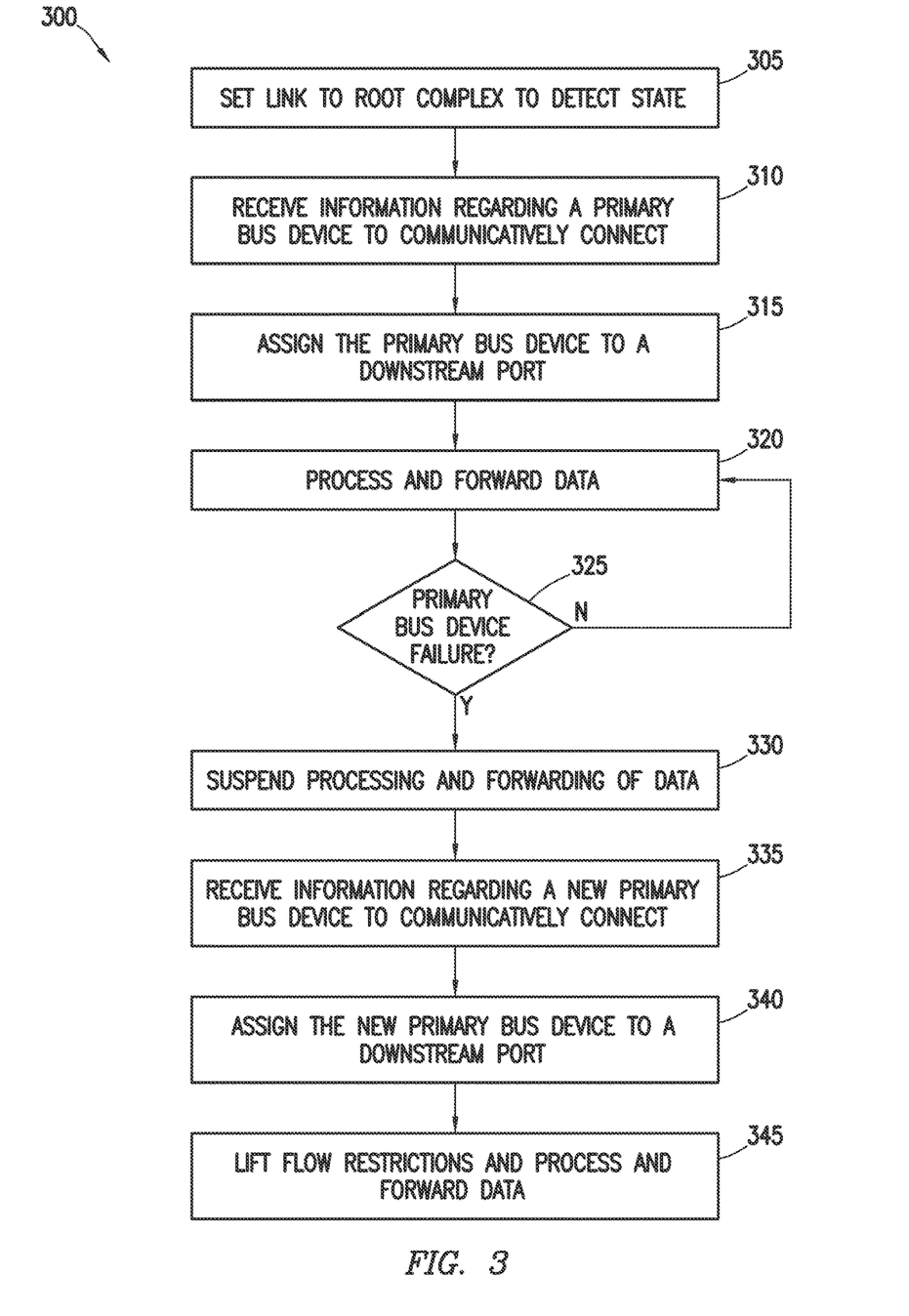
FIG. 3 illustrates a flowchart depicting selected elements of an embodiment of a method for managing peripheral bus device failures in accordance with some embodiments of the present disclosure.

FIG. 3 illustrates a flowchart depicting selected elements of an embodiment of method 300 for managing peripheral bus device failures in accordance with some embodiments of the present disclosure. The steps of method 300 may be performed by various computer programs, models or any combination thereof. The programs and models may include instructions stored on a non-transitory computer-readable medium that are operable to perform, when executed, one or more of the steps described below. The computer-readable medium may include any system, apparatus or device configured to store and/or retrieve programs or instructions such as a microprocessor, a memory, a disk controller, a compact disc, flash memory or any other suitable device. The programs and models may be configured to direct a processor or other suitable unit to retrieve and/or execute the instructions from the computer-readable medium. For example, method 300 may be executed by a processing resource of a bus switch and/or other suitable source. For illustrative purposes, method 300 may be described with respect to the processing resource 230 of bus architecture 200a or 200b shown in FIGS. 2A and 2B, respectively; however, method 300 may be used for any processor, bus switch, or any other component of a bus architecture of any suitable configuration.

In step 305, a processing resource sets the link between a root complex and the processing resource and/or an arbitration entity to a detect state and detects that a host is connected or powered on. A host may be a root complex, an information handling system, or any other suitable device. For example, as discussed with reference to FIGS. 2A and 2B, processing resource 230 and/or arbitration entity 210 may maintain root port 214 as the link from root complex 206 to arbitration entity 210 in a detect state until a downstream bus device 218 is communicatively connected.

In step 310, the processing resource receives information regarding a primary bus device to communicatively connect. For example, as discussed with reference to FIGS. 2A and 2B, arbitration entity 210 may receive information from management module 212 regarding a primary bus device selected from a cluster of redundant bus devices. As such, management module 212 may select bus device 218-1 as the primary bus device from cluster 216-1. In some embodiments, other entities may select the primary bus device. For example, an operator or user of a bus architecture system may select a primary bus device from a cluster of redundant bus devices.

In step 315, the processing resource assigns the primary bus device to an arbitration entity or bus switch downstream port. For example, management module 212 may select bus device 218-1 as the primary bus device. Arbitration entity 210 and/or management module 212 may assign bus device 218-1 to downstream port 220-1, or to any other downstream port, in order for bus device 218-1 to be the primary bus device for cluster 216-1. After assignment, the downstream port and the primary bus device may undergo a PCIe retraining sequence and achieve L0 state—fully active state—on completion. The device configuration exposed upstream to root complex 206 reflects the configuration of the bus device connected to the downstream port. In PCIe context, once the downstream port of the arbitration entity reaches fully active/L0 state, the configuration exposed by the bus device is duplicated at the upstream root port 214 of arbitration entity 210 with the assistance of processing resource 230 and exposed upwards to root complex 206 as the link upstream of arbitration entity 210 to root complex 206 trains and attains fully active/L0 state In step 320, the processing resource and/or arbitration entity begins processing data, e.g., TLPs, and forwarding to the primary bus device.

In step 325, the processing resource and/or a management module determines whether a primary bus device has failed. As an example, arbitration entity 210 may be notified by management module 212 that a primary bus device has failed or may detect the failure in any other manner. If the primary bus device has failed, method 300 may proceed to step 330. If the primary bus device has not failed, method 300 may return to step 320.

In step 330, the processing resource suspends processing and forwarding data. For example, arbitration entity 210 may suspend processing and forwarding TLPs and may return outstanding TLPs to the root complex, or other requester, with an instruction or transmission of a request to retry notification. The arbitration entity may use DLLP flow control to ensure that the requester cannot send further commands.

In step 335, the processing resource receives information regarding a new primary bus device to communicatively connect. For example, arbitration entity 210 may receive information from management module 212 regarding a new primary bus device selected from the cluster of redundant or reserve bus devices. As such, management module 212 may detect that the current primary bus device 218-1 has failed. Management module 212 may select a different bus device, such as bus device 218-2, as the primary bus device from cluster 216-1. In some embodiments, other entities may select a new primary bus device. For example, an operator or user of a bus architecture system may select a new primary bus device from a cluster of redundant bus devices.

In step 340, the processing resource assigns the new primary bus device to the downstream port. For example, management module 212 may select bus device 218-2 as the new primary bus device. Arbitration entity 210 and/or management module 212 may assign bus device 218-2 to downstream port 220-2, or to any other downstream port, in order for bus device 218-2 to be the primary bus device for cluster 216-1. Notably, processing resource 230 and/or arbitration entity 210 may be configured to isolate root complex 206 and other upstream components from the failure of the primary bus device, e.g., bus device 218-1, and the assignment of a new primary bus device, e.g., bus device 218-2, such that root complex 206 and other upstream components are unaware of a failure of any bus device 218. After assignment of the new primary bus device, the downstream port and the new primary bus device may undergo a PCIe retraining sequence and achieve L0 state—fully active state—on completion. The configuration of the new primary device may be reflective of the configuration exposed to root complex 206 by root port 214 from arbitration entity 210. In step 345, the processing resource and/or arbitration entity may lift flow restrictions and begin processing data, e.g., TLPs, and forwarding to the new primary bus device.

Modifications, additions, or omissions may be made to method 300 without departing from the scope of the present disclosure and invention. For example, the order of the steps may be performed in a different manner than that described and some steps may be performed at the same time. For example, step 305 and step 310 may be performed simultaneously. Additionally, each individual step may include additional steps without departing from the scope of the present disclosure. For example, step 315 may include additional steps or options as described herein without departing from the scope of the present disclosure.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for managing peripheral device failures, comprising:
    defining, at a management module, a first cluster of redundant bus devices and a second cluster of redundant bus devices, wherein each cluster contains an active bus device and one or more passive bus devices, wherein the bus devices in the first cluster are different types of bus devices than those in the second cluster;
    detecting, at a processor of a peripheral bus, a failure of a first bus device at a downstream port from the processor, wherein the downstream port is populated by the first bus device, wherein the processor is communicatively coupled at an upstream port to a root complex and the processor is configured to isolate the failure of the first bus device from the root complex, wherein the processor further includes an arbitration entity communicatively coupled to and located downstream from the root complex, the arbitration entity configured to present the first bus device upstream to the root complex, the arbitration entity further associated with the management module, and wherein the first bus device is a member of the first cluster; and
    responsive to detecting the failure at the management module:
        suspending communication of data to the first bus device;
        receiving information regarding a second bus device, wherein the second bus device is a member of the first cluster and redundant of the first bus device;
        transitioning the second bus device from a passive state to an active state; and
        assigning the second bus device to the downstream port.

2. The method of claim 1, wherein the processor includes a management module.

3. The method of claim 1, wherein the second bus device is selected by a management module communicatively coupled to the processor.

4. The method of claim 1, wherein suspending communication of data includes returning transaction layer packets (TLPs) to the root complex.

5. The method of claim 4, wherein returning TLPs to the root complex includes transmitting a request for retry notification.

6. The method of claim 1, wherein the peripheral bus is a peripheral component interconnect express bus.

7. The method of claim 6, wherein suspending communication of data includes using data link layer packet (DLLP) flow control.

8. An information handling system for managing peripheral device failures comprising:
    a management module configured to define a first cluster of redundant bus devices and a second cluster of redundant bus devices, wherein each cluster contains an active bus device and one or more passive bus devices, wherein the bus devices in the first cluster are different types of bus devices than those in the second cluster;
    a processor for a peripheral bus, the processor configured to:
        detect a failure of a first bus device at a downstream port from the processor, wherein the downstream port is populated by the first bus device, wherein the processor is communicatively coupled at an upstream port to a root complex and the processor is configured to isolate the failure of the first bus device from the root complex, wherein the processor further includes an arbitration entity communicatively coupled to and located downstream from the root complex, the arbitration entity configured to present the first bus device upstream to the root complex, the arbitration entity further associated with the management module, and wherein the first bus device is a member of the first cluster; and responsive to detecting the failure at the management module:
suspend communication of data to the first bus device;
receive information regarding a second bus device, wherein the second bus device is a member of the first cluster and redundant of the first bus device;
transition the second bus device from a passive state to an active state; and
assign the second bus device to the downstream port.

9. The information handling system of claim 8, wherein the processor includes a management module.

10. The information handling system of claim 8, wherein the second bus device is selected by a management module communicatively coupled to the processor.

11. The information handling system of claim 8, wherein suspending communication of data includes returning transaction layer packets (TLPs) to the root complex.

12. The information handling system of claim 11, wherein returning TLPs to the root complex includes transmitting a request for retry notification.

13. A non-transitory computer-readable medium storing instructions, that, when executed by a processor, cause the processor to:

define, at a management module, a first cluster of redundant bus devices and a second cluster of redundant bus devices, wherein each cluster contains an active bus device and one or more passive bus devices, wherein the bus devices in the first cluster are different types of bus devices than those in the second cluster;

detect a failure of a first bus device at a downstream port from the processor, wherein the downstream port is populated by the first bus device, wherein the processor is communicatively coupled at an upstream port to a root complex and the processor is configured to isolate the failure of the first bus device from the root complex, wherein the processor further includes an arbitration entity communicatively coupled to and located downstream from the root complex, the arbitration entity configured to present the first bus device upstream to the root complex, the arbitration entity further associated with the management module, and wherein the first bus device is a member of the first cluster; and responsive to detecting the failure at the management module:
suspend communication of data to the first bus device;
receive information regarding a second bus device, wherein the second bus device is a member of the first cluster and redundant of the first bus device;
transition the second bus device from a passive state to an active state; and
assign the second bus device to the downstream port.

14. The non-transitory computer-readable medium of claim 13, wherein the processor includes a management module.

* * * * *